United States Patent [19]

Nelson et al.

[11] Patent Number: 5,745,609

[45] Date of Patent: Apr. 28, 1998

[54] FIXED PATTERN COMPENSATION WITH ADAPTIVE WINDOW FOR MTF TESTING

[75] Inventors: Neil R. Nelson, Anaheim; Harold J. Orlando, Costa Mesa; Marco A. Lopez, Villa Park, all of Calif.

[73] Assignee: Northrop Grumman Corporation, Los Angeles, Calif.

[21] Appl. No.: 790,126

[22] Filed: Jan. 29, 1997

Related U.S. Application Data

[63] Continuation of Ser. No. 399,116, Mar. 3, 1995, abandoned.

[51] Int. Cl.$^6$ ........................................................ G06K 9/40
[52] U.S. Cl. ........................ 382/264; 348/618; 358/468; 382/275
[58] Field of Search ................................. 382/254, 264, 382/260, 275, 280; 348/618, 607; 358/468

[56] References Cited

U.S. PATENT DOCUMENTS

| | | | |
|---|---|---|---|
| 4,653,909 | 3/1987 | Kuperman | 356/124.5 |
| 5,191,621 | 3/1993 | Brok | 382/100 |
| 5,294,075 | 3/1994 | Vertatschitsch et al. | 244/75 R |
| 5,307,175 | 4/1994 | Seachman | 358/401 |
| 5,504,523 | 4/1996 | Wight et al. | 348/208 |

FOREIGN PATENT DOCUMENTS

| | | |
|---|---|---|
| 58-118940 | 7/1983 | Japan. |
| 59-46833 | 3/1984 | Japan. |

OTHER PUBLICATIONS

T. L. Williams, "A workshop instrument for testing binocular and other sights using the m.t.f. criterion", Optics and Laser Technology, Jun. 1972, pp. 115–120.

T.L. Williams, "An Instrument For Measuring The MTF of Lenses Used in Thermal Imaging And Other Infrared Systems (2 to 14um)", Conference: Image Assessment & Specification, Rochester, NY, May 20–22,1974, pp. 305–311.

T.L. Williams, "Standard Reference Lenses For The Infrared", Proceedings of The Society of Photo–Optical Instrumentation Engineers, vol. 98 Assessment of Imaging System (Sira Nov. 1976 London, pp. 16–20.

R. Barakat, "Determination of The Optical Transfer Function Directly From The Edge Spread Function", Journal of The Optical Society of America, vol. 55, No. 10, Oct. 1965, pp. 1217–1221.

D.Elliott, Handbook of Digital Signal Processing Engineering Applications, Academic Press, Inc. pp. 1–33, 55–57, 172–175, 289–291, 359–361, 481–483, 527–529, 633–635, 701–703, 741–743, 788–791, 857–859, 899–901, 941–943, 975–985.

Primary Examiner—Yon Couso
Assistant Examiner—Jayanti K. Patel
Attorney, Agent, or Firm—Terry J. Anderson; Karl J. Hoch, Jr.

[57] ABSTRACT

This invention is an apparatus and method that is able to accurately measure the system level modulation transfer function in the presence of fixed pattern noise from an imaging system electronics.

8 Claims, 4 Drawing Sheets

(1) INPUT DATA
   VIDEO SIGNAL
   EXPECTED TO HAVE EDGE FEATURE

DIGITIZE (2) TAKE DERIVATIVE OF EDGE RESPONSE
   LINE SPREAD FUNCTION (3) CALCULATE WINDOW
   USE WINDOW TO ELIMINATE FIXED PATTERN NOISE
   SEE ITEM/GRAPH LABELLED WINDOW (4) MULTIPLY LINE SPEED FUNCTION (LSF) BY WINDOW

FOURIER TRANSFORM THE RESULT

OUTPUT
EVALUATE SENSOR PERFORMANCE

FIG. 2

FIXED PATTERN COMPENSATION WITH ADAPTIVE WINDOW FOR MTF TESTING

This is a continuation of application Ser. No. 08/399,116 filed on Mar. 3, 1995, now abandoned.

FIELD THE INVENTION

This invention relates to measurement systems and more particularly to the measurement of the system level modulation transfer function in the presence of fixed pattern noise from an imaging system electronics.

BACKGROUND OF THE INVENTION

Imagery is the representation of a subject by sensing quantitatively the patterns of electromagnetic radiation emitted by, reflected from, or transmitted through a subject of interest. Electronic imagery takes advantage of the sensitivity of various electronic detectors to different bands of the electromagnetic spectrum. The energy received is transduced by these sensors into an electronic or electrical effect from which effects an option of ways to process and display the information is available. The most common form of electronic imagery is found in television and charge-coupled-devices.

The modulation transfer function (MTF) is the measurement of the ability of an optical system to reproduce various levels of detail from the object to the image, as shown by the degree of contrast (modulation in the image). The MTF is a measure of the effectiveness with which a device, transmits the different frequencies applied to it, it is a phasor whose magnitude is the ratio of the magnitude of the output signal to that of a sine wave input, and whose phase is that of the output with respect to the input.

The resolving power of an imaging device such as a TV camera or infrared imaging device is usually quantified by the measurement of its Modulation Transfer Function (MTF) which is similar to the frequency response of an electronic circuit. The measurement is made by optically inputting a point-like light source while recording the camera output. The MTF is the magnitude of the Fourier transform of the camera output and corresponds to the resolution or the ability to image a detailed scene with the device. When the test is implemented, the camera introduces noise and jitter which show up in the output as an error term to the MTF. Noise occurring as random noise can be averaged out with time and occurs as wide-band and narrow-band (periodic) sources. The jitter causes a loss of MTF due to smearing when averaging successive frames of data over long test times. Effects of jitter can be avoided by averaging the resulting MTFs but results in a bias error due to averaging magnitudes. The foregoing may be compensated by finding the location of the image on each frame and compensating its position shift due to jitter. Wide band noise has a negligible effect on locating the image but narrow band noise introduced large errors in finding the image location. These errors result in an image shift which spread the image and result in an MTF measurement error.

The MTF is a measurement of the sensors ability to respond to an infinitesimal width line source. The measurement should be able to process data that has a high signal to noise ratio in the presence of fixed pattern noise. Unfortunately, prior art systems were unable to accomplish the above.

Reference may be had to the following patents for further information concerning the state of the prior art. In U.S. Pat. No. 4,653,909, issued Mar. 31, 1987 entitled "Sinusoidal Determination of Limiting Optical Resolution" to Kuperman there is disclosed the measurement of a system level MTF using a Heaviside edge function. The patent also describes the use of the AIM curve (Aerial Image Modulation), or modulation detectability curve, in combination with the MTF to predict the resolution of an optical system.

In Japanese Patent Application No. 59-46833 entitled "Peak Detector for MTF Measuring Machine" there is disclosed the measurement of a lens centration and MTF. The MTF is measured by measuring the spectrum a slit image. The centration is measured by locating the peak of the slit image.

In Japanese Patent Application No. 58-118940 entitled "Measuring Method of Modulation Transfer Function Measuring Machine of Lens", there is disclosed a machine for rapidly measuring the MTF of a lens. The MTF is measured by measuring the spectrum of a slit image. A threshold is used to eliminate the noise from the CCD.

The following T. L. Williams articles: "Standard References Lenses for the Infrared Proceedings of The Society of Photo-Optical Instrumentation Engineers", Nov. 16–18, 1976, pp. 16–20; "An Instrument for Measuring the MTF of Lenses Used in Thermal Imaging and Other Infrared Systems", Image Assessment Specification Conference, Rochester, N.Y., May 20–22, 1978, pp. 305–311; and "A Workshop Instrument For Testing Binocular and Other Sights Using the MTF Criterion", Optics and Laser Technology, June 1972, pp. 115–120, disclose the measurement of MTF of an infrared optical system and an optical system in general. There is no reference to MTF testing of an infrared sensor which includes the optical system, detector geometry and processing electronics. There is also no reference to any methods of reducing noise in the measurement.

Richard Barakat article entitled "Determination of the Optical Transfer Function Directly from the Edge Spread Function" Journal of the Optical Society of America, Volume 15, Number 10, discloses the inversion of a Fredholm integral equation of the first kind using sampling theory concepts.

SUMMARY OF THE INVENTION

This invention overcomes the disadvantages of the prior art by providing an apparatus and method that accurately measures the system level Modulation Transfer Function (MTF) in the presence of fixed pattern noise from an imaging system electronics. The apparatus of this invention utilizes an algorithm which locates the signal that has an edge feature by using a signal window, then the apparatus takes the derivative of the edge of the signal to obtain the line spread function, and the window of the data is then centered. The sequenced data is then processed using a Fourier transform to obtain the MTF. An advantage of this invention is that it allows the implementation of edge response MTF in the presence of periodic noise.

An additional advantage of this invention is that it may be used for the automatic testing of infrared cameras where hand selecting test data is not practical.

BRIEF DESCRIPTION OF THE DRAWINGS

FIG. 2 is a flow chart which depicts the routines of the algorithm that is contained in the scratch pad of FIG. 1;

DETAILED DESCRIPTION OF THE INVENTION

Figure 1:
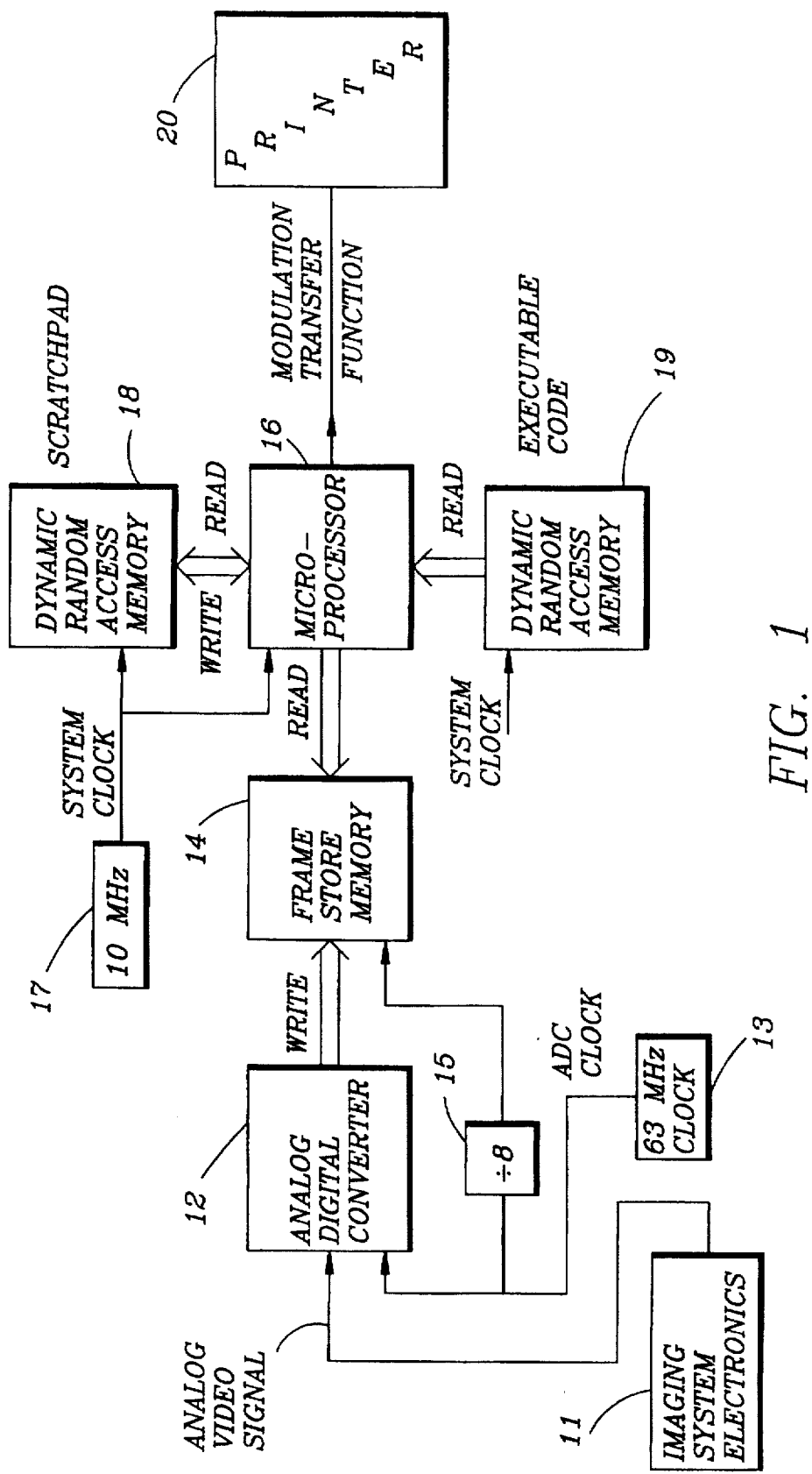
FIG. 1 is a block diagram of the apparatus of this invention.

Referring now to the drawings in detail, and more particularly to FIG. 1, the reference character 11 represents an imaging system electronics that produces an analog video output signal. Electronics 11 may be a television, a charged coupled device, video sensor, etc. The aforementioned analog video output signal is coupled to one of the inputs of analog to digital converter 12. The other input to analog to digital converter 12 is the output of 63 MHz clock 13. The output of A/D converter 12 is a digital representation of an image appearing in one frame of the aforementioned analog video signal, which is coupled to one of the inputs of frame store 14. The other input to frame store 14 is the output of divide by 8 divider 15. The input to divider 15 is the output of clock 13. Frame store 14 stores the digital representation of the output of A/D converter 12 and microprocessor 16 reads the digital data stored in frame store 14. System clock 17 produces an 10 MHz output pulse that is coupled to one of the inputs of microprocessor 16, to one of the inputs of dynamic random access memory 18 and to one of the inputs of dynamic random access memory 19. Memory 18 is coupled to microprocessor 16, microprocessor 16 is coupled to memory 19.

The algorithm hereinafter described in the description of FIG. 2 is stored in memory 19. Microprocessor 16 uses memory 18 as a scratch pad memory to calculate the modulation transfer function according to the instructions contained in the aforementioned algorithm. The output of microprocessor 16, in the modulation transfer function, is connected to the input of printer 20.

Printer 20 prints a series of numbers that is the modulation transfer function. The aforementioned numbers are interpreted spelling to determine the quality of the images being produced by imaging system electronics 11.

FIG. 2 is a flow chart which depicts the routines or modes of the MTF algorithm which are effected in cooperation with the components shown in FIG. 1.

Step 1 digitizes the video signal input data which is expected to have edge features. This step is further illustrated in the description of FIG. 3.

Step 2 takes the derivative of the edge response line spread function. This step is further illustrated in the description of FIG. 4.

Step 3 calculates the window and uses the window to eliminate fixed pattern noise. This step is further illustrated in the description of FIG. 5.

Step 4 multiplies the line speed function by the window.

Step 5 Fourier transform the result output. This step is further illustrated in the description of FIG. 6.

The following is the MTF algorithm that was illustrated in the flow chart described in the description of FIG. 2.

(1) Average and align edge functions

---

Ndft = 1 + 2 * trunc(2.5 * Srate − 0.5) (Period = 1, Ndft is odd)
Num_Deriv_Coeff = 7
initialize average array to zero
for i = 1 to Ndft + 2 * Num_Deriv_Coeff
    edge_avg[i] = 0
for j = 1 to Nframes
    capture a frame of video
    select the line designated by the TPS, edge_data[k]
    take derivative of the line (use filter coefficients for edge alignment)
    the edge is defined as the maximum derivative (reference to the edge array)
    edge_index = max (line derivative) + Num_Deriv_Coeff
    add line to edge_avg centered on edge_index
    for i − 1 to Ndft + 2 * Num_Dif_Coeff
        edge_avg[i] = edge_avg[i] +
        edge_data[edge_index − 0.5 ( Ndft − 1) + 1]
divide by Nframes to get average function
for i = 1 to Ndft + 2 * Num_Deriv_Coeff
    edge_avg[i] = edge_avg[i] / Nframes

---

(2) Take derivative of average edge function (use filter coefficients for edge alignment)

---

Initialize the filter coefficients for edge alignment
VI_DIFF_COEFF_AL[1] = 0.0144
VI_DIFF_COEFF_AL[2] = 0.0256
VI_DIFF_COEFF_AL[3] = 0.0311
VI_DIFF_COEFF_AL[4] = 0.0299
VI_DIFF_COEFF_AL[5] = 0.0230
VI_DIFF_COEFF_AL[6] = 0.0131
VI_DIFF_COEFF_AL[7] = 0.0040
for 1 = 1 to Ndft
    lowpass_lsf[1] = 0
    for m − 1 to Num_Deriv_Coeff
        lowpass_lsf[1] = VI_DIFF_COEFF_AL[m] *
        ( edge_avg[1+Num_Deriv_Coeff+m] −
        edge_avg[1+Num_Deriv_Coeff−m])

---

(3) Determine Tukey window from width of lowpass line spread function

--- max_deriv = max(lowpass_lsf)
find the index which corresponds to max_deriv
max_index = index(lowpass_lsf, max_deriv)
half_max_deriv = max_deriv / 2
pos_width = 1
while lowpass_lsf[max_index + pos_width] >=
    half_max_deriv pos_width = pos_width + 1
neg_width = 1
while lowpass_lsf[max_index − neg_width] >=
    half_max_deriv neg_width = neg_width + 1
N' = 1.5 * (pos_width + neg_width)/2
a = .4
for i = 1 to Ndft
    T_index = abs(i − 0.5(Ndft − 1)
    if T_index < a * N' then
        Tukey[i] = 1
    else if (a * N' <− T_index) and (T_index <= N') then
        Tukey[i] = 0.5 *
        (1 + cos((pi * (T_index − a * N')) /
        ((1 − a ) * N')))
    else if (T_index > N') then
        Tukey[i] = 0

---

Take derivative of average edge function (use filter coefficients for MTF, inscan or xscan).

```
for 1 = 1 to Ndft
    lsf[1] = 0
    for m = 1 to Num_Deriv_Coeff
        lsf[1] = deriv_coeff[m] *
        ( edge_avg[1+Num_Deriv_Coeff+m] -
          edge_avg[1+Num_Deriv-Coeff-m])
```

(4) Multiply Tukey and line spread function

```
for i = 1 to Ndft
    drt_data = lst[i] * Tukey[i]
```

(5) Take DFT of product of Tukey window and line spread function

MTF_raw[j] = DFT(dft_data) j = 0 ... (Ndtf − 1)/2
Interpolate MTF to have frequencies of 0.2 cyc/mrad
refer to PPS with Period = 1
Normalize to DC term
optimum window derivation
edge_points :=396
i :=) ... edge_points − 1
edgefcn := READPRN (edge)
Derivative Filter
fsamp :=50           Sampling Frequency [MHz]
fcutoff :=8.5        Cutoff Frequency [MHz]
deriv_points :=7     Number of coefficients in
                     derivative filter
T := 1
M := 1 ... deriv_points $$B_m := 2\pi \cdot m \cdot \frac{fcutoff}{fsamp}$$

$$C_m := \left[ 1 + \cos \left[ \pi \frac{m}{deriv_{points} + 1} \right] \right] \frac{B_m \cos[B_m] - \sin[B_m]}{2\pi \cdot m_2 \cdot T}$$

$c_m$
−0.1108
−0.1351
−0.0767
0.0155
0.0081
0.0005

Scale: = 2 · T · Σ_m m · C_m    Scale = −1.0363

$$deriv\_coeff_m := \frac{C_m}{Scale}$$

deriv_coeff_m
0.1069
0.1304
0.074
0.0088
−0.015
−0.0078
−0.0004
perform derivative on edge function
i :=deriv_points ... edge_points − 1 − deriv_points LSF_j := Σ_m deriv coeff_m[edgefcn_j + m − edgefcn_j − m]

$LSF_{184}$ = 13.3216
$LSF_{185}$ = 18.2057
$LSF_{186}$ = 17.2158
$LSF_{187}$ = 11.4919
Calculate LSF with a low-pass derivative
deriv_coeff_m :=
0.0145
0.0257
0.0311

0.0299
0.0230
0.0131
0.0039
Lowpass derivative filter
Fsamp = 50 MHz
Fcutoff = 0.5 MHz filt_LSF_j := Σ_M deriv_coeff_m[edgefcn_{j+m} − edgefcn_{j−m}]

LSF_max :=max(filt_LSF)
LSF_max = 9.224
filt $LSF_{185}$ = 9.1443
filt_$LSF_{186}$ = 9.224
filt_$LSF_{187}$ = 8.401
k := 175 ... 250
find_max_index_k := until
[[LSF-max = filt_$LSF_k$] − .5, k]
k_max := last(find_max_index)
k_max = 186
now place the LSF into the vector fft_data symmetric about
k_max
fft_points :=64
i :=0 ... fft_points − 1

$$half\_fft\_points := \frac{fft\ points}{2}$$

j := 0 ... half_fft_points − 1
fft_data1_i := LSF_{k_max-half_fft_points*1}
p := 30
fft_data1_p = 13−3216 fft_data1_{p+1} = 18.2057
fft_data1_{p+2} = 17.2158
Window derivation
Tukey Window
    Determination of a and N' for input to Tukey
    Window
    0 <= a <= 1
    a set to half of the FWHM of the filtered LSF $$LSF\_half\_max := \frac{LSF\ max}{2}$$

k := k_max ... 300
pos_half_max_k := until
[LSF_half_max ≤ filt_$LSF_k$] − .5, k]
pos_half := last (pos_half_max) − k_max
pos_half = 4
k :=100 ... k_max
neg_half_max_k := until
[LSF_half_max ≥ filt_$LSF_k$] − .5, k]
neg_half := k_max − last(neg_half_max)
neg_half = 3

$$N^1 := \frac{pos\ half + neg\ half}{2} \quad 1.5$$

Full Width Half Maximum of filtered LSF
a := .4
N' = 5.25
a N' = 2.1
    Calculate Tukey window for a and N'
n_i := i − half_fft_points
Tukey_i = [|n_i|<aN^1|^1 ... +

$[aN^1 \leq |n_i|] [|n_i| \leq N^1]0.5 \left[ 1 + \cos \left[ \frac{[|n_i| - aN^1]\pi}{(1-a)N^1} \right] \right] +$ $[|n_i|>N^1|>N^1|^0$
comp_win_mtf := fft(Tukey)

$$win\_mtf_j := \frac{|comp\ win\ mtf_j|}{|comp\ win\ mtf_0|}$$

fft_data2_1 := fft_data1_j Tukey_j
fft_data_1, fft_data2_j, 20 Tukey
comp_mtf1 := fft(fft_data1)
mrad = 1
samp_fov := 9.88 mrad -continued $$mtfl_j := \frac{|comp\_win\_mtf_j|}{|comp\_win\_mtf_o|}$$

$$freq_j := \frac{j}{samp\_fov}$$

comp_mtf2 := fft (fft_data2)

$$mtf2_j := \frac{|comp\_win\_mtf_j|}{|comp\_win\_mtf_o|}$$

WRITEPRN (edgelmtf) := mtf2
WRITEPRN (edgeamtf) := mtf1

Figure 3:
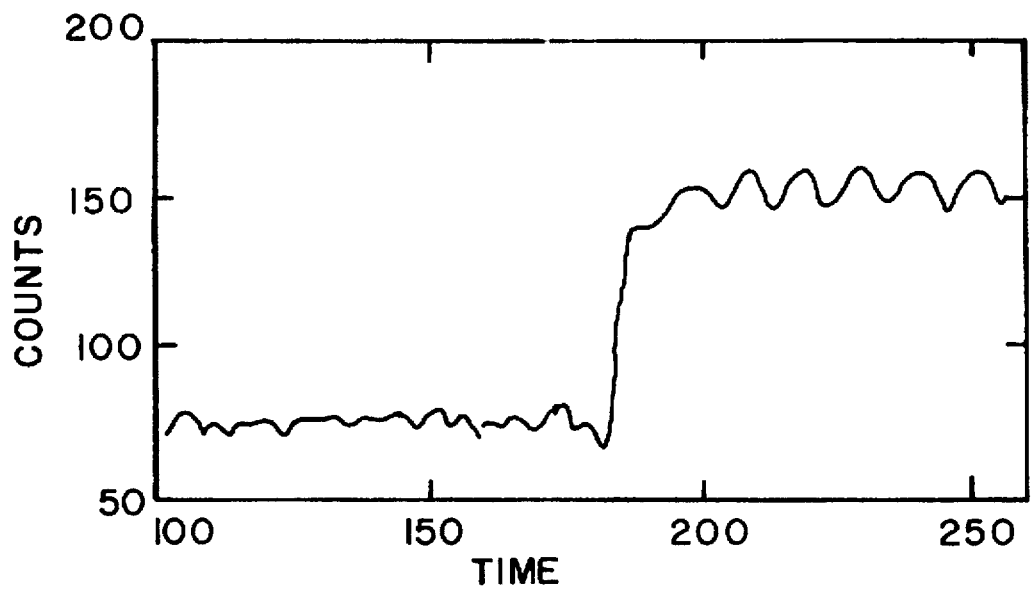
FIG. 3 is a graph of the edge response or the time vs. counts of the input data video signal.

FIG. 3 is a graph of the edge response or the time vs. counts of the input data video signal, i.e., digitized video from an infrared camera that was expected to have edge features. The digitized video of the edge response of the imaging device was averaged to reduce the temporal noise while leaving the fixed pattern noise.

Figure 4:
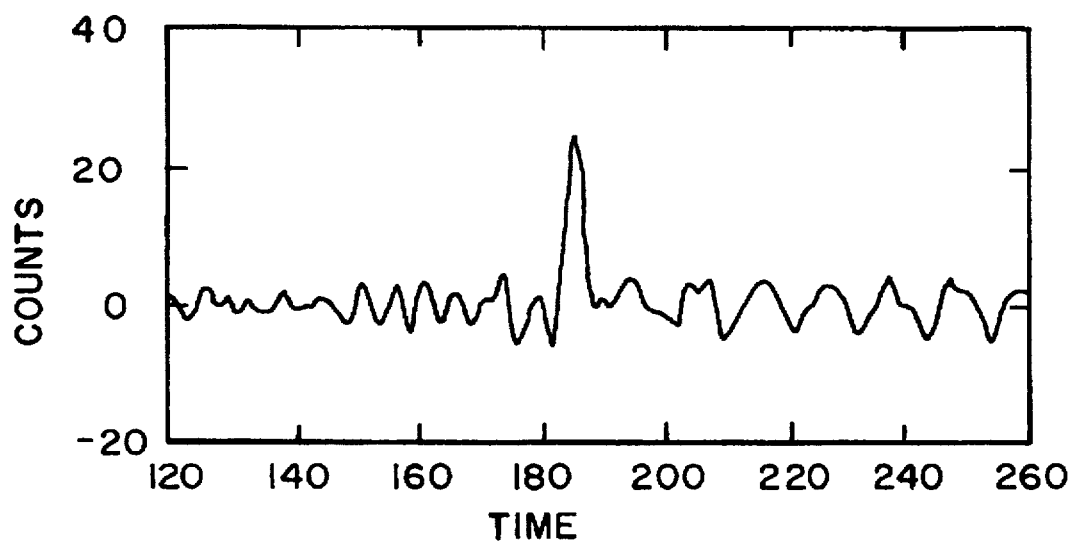
FIG. 4 is a graph of the resulting edge response line spread function or the time vs. counts of the input data with a digital filter.

FIG. 4 is a graph of the resulting edge response line spread function or the time vs. counts of the input data with a digital filter which performs a derivative and attenuates high frequency components beyond the frequency response of the sensor.

Figure 5:
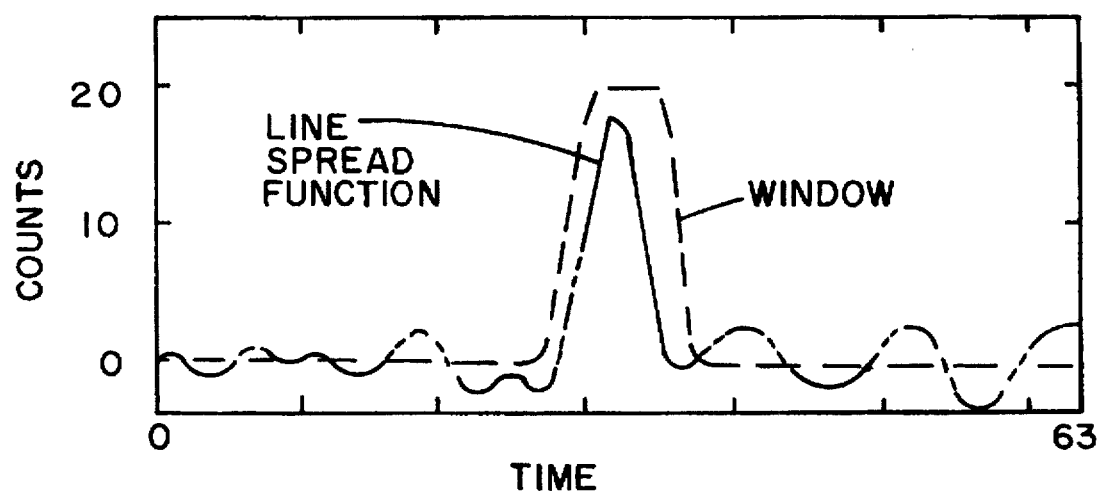
FIG. 5 is a graph of the time vs. response of the calculated window and the line spread function.

FIG. 5 is a graph of the time vs. counts of the calculated window and the line spread function. Parameters are calculated for the window to compensate for fixed pattern noise. The input data is processed with a digital filter which performs a derivative and attenuates high frequency components. The cutoff frequency is slightly lower than the digital filter described in the description of FIG. 3. The foregoing broadens the output pulse. From the width of the broadened output pulse the parameters of the window are calculated.

Figure 6:
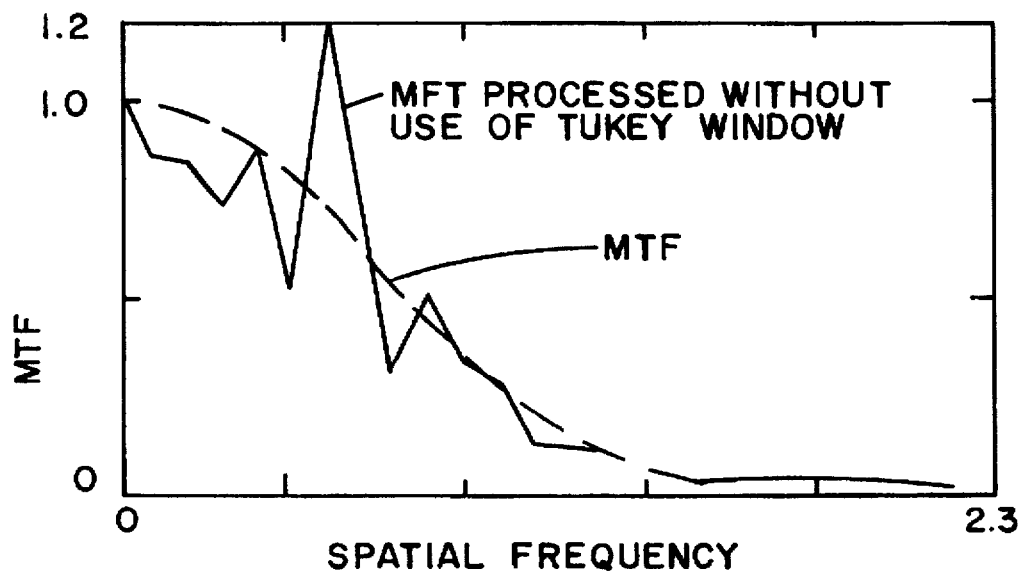
FIG. 6 is a graph of the spatial frequency vs. the MTF and the line spread function corrupted with fixed pattern noise.

FIG. 6 is a graph of the spacial frequency vs. the MTF and the line spread function corrupted with fixed pattern noise, which is shown by the large peak in the graph. The product of the window and the line spread function is processed with the Fourier Transform. The magnitude of the Fourier Transform is the MTF.

The above has shown that the MTF can be accurately measured in the presence of fixed pattern noise. The aforementioned method and apparatus utilizes a window which is sized depending on the input data. This allows the signal (the pulse) to remain uncorrupted while the fixed pattern noise is attenuated. The foregoing produces an accurate MTF.

The above specification describes a new and improved apparatus and method that accurately measures the system level modulation Transfer Function in the presence of fixed pattern noise from an imaging system electronics. It is realized that the above description may indicate to those skilled in the art additional ways in which the principals of this invention may be used without departing from the spirit. It is, therefore, intended that this invention be limited only by the scope of the appended claims.

What is claimed is:

1. A method of producing a modulation transfer function in the presence of fixed pattern noise produced by imaging system electronics, said method comprising the steps of:

a) digitizing an electronic signal to provide input data produced by the imaging system electronics for an image, which image is expected to have edge features, said input data having a first bandwidth;

b) taking the derivative of an edge response of the image by a digital filter having plural filter coefficients and a second bandwidth less than said first bandwidth to obtain a low pass line spread function;

c) calculating a window from the width of the low pass line spread function to compensate for fixed pattern noise, the window being sized depending on the input data;

d) multiplying the window and the edge response line spread function; and e) taking a discrete Fourier Transform of the product of the window and line spread function to obtain the modulation transfer function.

2. The method claimed in claim 1, wherein said taking the derivative step further comprises:

taking the derivative with the frequency of the bandwidth of the sensed electronic signal.

3. The method claimed in claim 1, wherein the window is a Tukey window.

4. A method of producing a modulation transfer function in the presence of fixed pattern noise produced by imaging system electronics, said method comprising the steps of:

a) locating a signal providing input data produced by the imaging system electronics for an image that has an edge feature, said locating being accomplished by using a signal window, said input data lying within a first bandwidth;

b) taking the derivative of the signal at the edge of the image to obtain a line spread function, said taking of the derivative being accomplished by a digital filter having plural filter coefficients and a second bandwidth less than said first bandwidth to obtain a low pass line spread function;

c) centering the window on data of the signal, said centering including a step of calculating the window from the width of the low pass line spread function to compensate for fixed pattern noise, the window being sized depending on the input data; and d) performing a Fourier Transform on the data to obtain the modulation transfer function.

5. A system for producing a modulation transfer function from imaging system electronics, said system comprising:

an analog to digital converter that converts an analog video signal providing input data produced by the imaging system electronics into a digital signal that represents an image appearing in the analog video signal, said input data lying within a first bandwidth;

a memory coupled to said analog to digital converter, said memory digitally storing one frame at a time of the video signal to provide a digitally stored video signal;

means coupled to said memory for computing the modulation transfer function from the digitally stored video signal, wherein said computing means includes means for obtaining the line spread function of an edge of the image by taking the derivative of an edge response of the image by a digital filter having plural filter coefficients and a second bandwidth less than said first bandwidth to obtain a low pass line spread function, and means for calculating a window from the width of the low pass line spread function to compensate for fixed pattern noise, the window being sized depending on the input data and being employed to window the low pass line spread function prior to computation of the modulation transfer function; and means for indicating the modulation transfer function.

6. The system claimed in claim 5, wherein said indicating means is a printer.

7. The system claimed in claim 5, wherein said means for computing is a microprocessor that contains one or more memories.

8. The system claimed in claim 5, wherein said memory is a frame store.

* * * * *